US012708229B2

(12) United States Patent
Pas et al.

(10) Patent No.: US 12,708,229 B2
(45) Date of Patent: Aug. 18, 2026

(54) ARTIFICIAL TREE AND RETRACTABLE BRACKET THEREOF

(71) Applicant: Dongguan Polyfilm Plastic Products Company Limited, Dong Guan City (CN)

(72) Inventors: Hylke Pas, Dong Guan City (CN); Song Yu Hu, Dong Guan City (CN)

(73) Assignee: DONGGUAN POLYFILM PLASTIC PRODUCS COMPANY LIMITED, Dong Guan City (CN)

( * ) Notice: Subject to any disclaimer, the term of this patent is extended or adjusted under 35 U.S.C. 154(b) by 211 days.

(21) Appl. No.: 18/607,190

(22) Filed: Mar. 15, 2024

(65) Prior Publication Data

US 2025/0288140 A1 Sep. 18, 2025

(51) Int. Cl.
*A47G 33/06* (2006.01)
*F16M 13/02* (2006.01)

(52) U.S. Cl.
CPC ............. *A47G 33/06* (2013.01); *F16M 13/02* (2013.01)

(58) Field of Classification Search
CPC ..... F16M 13/02; A47G 33/06; A47G 25/0685
USPC ........................................... 211/105.3, 105.5
See application file for complete search history.

(56) References Cited

U.S. PATENT DOCUMENTS 1,495,695 A * 5/1924 Karr ...................... A47G 33/06 428/8
2,826,846 A * 3/1958 Warren ................. A47G 33/06 211/1
3,441,147 A * 4/1969 Kelley ............... A47G 25/0685 211/113
3,981,404 A * 9/1976 Goeke ................ A47G 25/0685 211/105.3
4,778,089 A * 10/1988 White ....................... B60R 7/10 224/927
5,702,010 A * 12/1997 Liang .................... D06F 57/122 211/206
10,791,781 B2 * 10/2020 Falk ....................... A47G 33/06
12,239,252 B2 * 3/2025 Kaplan .................. A47G 33/12
12,302,970 B2 * 5/2025 Falk ....................... A47G 33/06
2006/0091277 A1 * 5/2006 Wang ..................... A47G 33/06 248/405
2007/0272637 A1 * 11/2007 Rigas ................ A47G 25/0685 211/119.004
2009/0242500 A1 * 10/2009 Li ...................... A47G 25/0685 211/116
2022/0104648 A1 * 4/2022 Zhao ...................... A47G 33/10
(Continued)

*Primary Examiner* — Bradley Duckworth

(74) *Attorney, Agent, or Firm* — Finnegan, Henderson, Farabow, Garrett & Dunner LLP

(57) ABSTRACT

The present disclosure relates to an artificial tree and a retractable bracket connected to a support device, which includes a fixed rod and a retractable rod. The fixed rod is connected to the support device. The retractable rod is movably connected to the fixed rod and capable of being fixed relative to the fixed rod in any desired position, such that a first mounting portion configured to hang or place an object to be placed is formed between the retractable rod and the fixed rod. An end of the bracket away from the support device is capable of being relatively elongated and shortened, making it easier to hang or place an object to be placed, such as an ornament, while reducing the risk of the object to be placed falling off.

19 Claims, 9 Drawing Sheets

(56) References Cited

U.S. PATENT DOCUMENTS

| | | | | |
|---|---|---|---|---|
| 2023/0157473 | A1* | 5/2023 | Moss | A47H 1/102 211/105.3 |
| 2024/0016325 | A1* | 1/2024 | Yang | A47G 33/06 |

* cited by examiner

ARTIFICIAL TREE AND RETRACTABLE BRACKET THEREOF

TECHNICAL FIELD

The present disclosure relates to the technical field of bracket structure, in particular to an artificial tree and a retractable bracket thereof.

BACKGROUND

An artificial tree, such as a simulated Christmas tree, includes a base, a bracket connected to the base, and a pine branch connected to the bracket. When ornaments are placed on the conventional artificial tree, the ornaments are generally choose to be placed directly on a branch on a top portion of the artificial tree. Because the branches are generally long and soft, and some ornaments are relatively heavy, ornaments may be hanged on all sides, thereby not only affecting beauty and being time-consuming and laborious, but also there is a risk of falling.

SUMMARY

Accordingly, it is necessary to provide an artificial tree and a retractable bracket thereof for the aforementioned technical issues. An end of the bracket away from the support device is capable of being relatively elongated and shortened, making it easier to hang or place an object to be placed, such as an ornament, while reducing the risk of the object to be placed falling off.

An embodiment of present disclosure provides a retractable bracket connected to a support device, which includes a fixed rod and a retractable rod. The fixed rod is connected to the support device. The retractable rod is movably connected to the fixed rod, and is capable of being fixed relative to the fixed rod in any desired position, such that a first mounting portion configured to hang or place an object to be placed is formed between the retractable rod and the fixed rod.

In an embodiment, the fixed rod includes a fixed end connected to the support device and an inserted end away from the fixed end. At least the inserted end is provided with an inserted hole extending in an axial direction of the fixed rod. The retractable rod includes a connecting end and a projecting end. The connecting end is movably inserted into the inserted hole and is capable of being fixed relative to the fixed rod in any desired position. At least part of the projecting end extends out of the inserted hole, such that the first mounting portion is formed between the projecting end and the inserted end.

In an embodiment, the retractable rod is provided with an abutting structure which is elastically deformable and is capable of abutting an inner wall of the inserted hole such that the connecting end is capable of being fixed relative to the fixed rod in any desired position. The retractable rod is operable to move relative to the fixed rod to overcome a friction between the abutting structure and the inner wall of the inserted hole.

In an embodiment, the abutting structure includes a fixed portion and at least two resilient claws connected to the fixed portion. Each resilient claw extends in a direction away from a central axis of the retractable rod. Each resilient claw abuts against the inner wall of the inserted hole and is pressed by the inner wall of the inserted hole to create a friction between the resilient claw and the inner wall of the inserted hole.

In an embodiment, each resilient claw includes a connecting portion and an abutting portion. The connecting portion is connected to the retractable rod. The abutting portion abuts against the inner wall of the inserted hole, and the abutting portion is farther from the central axis of the retractable rod than the connecting portion.

In an embodiment, the abutting portion is farther from the connecting end or the projecting end than the connecting portion.

In an embodiment, the at least two resilient claws include 2 to 8 resilient claws.

In an embodiment, the abutting structure is provided on the connecting end of the retractable rod.

In an embodiment, a limit portion is provided in the inserted hole. The limit portion is capable of abutting against the abutting structure or the connecting end of the retractable rod to restrict the retractable rod from moving in a direction of submerging in the inserted hole.

In an embodiment, the projecting end of the retractable rod is provided with an end portion, and the first mounting portion is formed between the end portion and the inserted end.

In an embodiment, the end portion is removably connected to the projecting end of the retractable rod.

In an embodiment, the bracket further includes a first support seat provided with a first through hole extending through the first support seat. The first support seat is removably connected to the inserted end, and the projecting end of the retractable rod extends through and out of the first through hole, such that the first mounting portion is formed between the projecting end and the first support seat.

In an embodiment, an aperture at the smallest aperture position of the first through hole is smaller than an outer diameter of the inserted end.

In an embodiment, the first support seat includes an inner ring portion provided with the first through hole and an outer peripheral portion surrounding the inner ring portion. The outer peripheral portion is connected to the inner ring portion, and a cavity is formed between at least part of the outer peripheral portion and at least part of the inner ring portion.

In an embodiment, a reinforcing rib is provided in the cavity, and both ends of the reinforcing rib are connected to the inner ring portion and the outer peripheral portion, respectively.

In an embodiment, the bracket further includes a second support seat provided with a second through hole extending through the second support seat and a second mounting portion configured to mount a branch. The branch is capable of being removably connected to the fixed rod via the second support seat, and the projecting end of the retractable rod extending through and out of the second through hole, such that the first mounting portion is formed between the projecting end and the second support seat.

In an embodiment, the bracket further includes a second support seat provided with a second mounting portion configured to mount a branch. The second support seat is removably connected to the first support seat, such that the second support seat is capable of selectively covering at least part of the first support seat.

In an embodiment, the second support seat is provided with a second through hole extending through the second support seat. At least part of an inner wall of the second through hole is provided with female threads, at least part of an outer circumference of the first support seat is provided with male threads, and at least part of the first support seat provided with the male threads is capable of extending into the second through hole and is threadably connected to the female threads via the male threads.

In an embodiment, at least part of the second through hole is a cylindrical hole, and the female threads are disposed on an inner wall of the cylindrical hole.

An artificial tree is provided, which includes the retractable bracket in any one of the aforementioned embodiments.

In the bracket of the artificial tree of the present disclosure, the retractable rod is fixed relative to the fixed rod in any desired position by the movably connection between the retractable rod and the fixed rod, such that a first mounting portion configured to hang or place ornaments is formed between the retractable rod and the first support seat. This makes it very convenient to hang or place the ornaments on the first mounting portion, and to adjust the dimensions of the first mounting portion by adjusting the relative position between the retractable rod and the fixed rod to securely hang or place the object to be placed, such as the ornaments, on the first mounting portion.

BRIEF DESCRIPTION OF THE DRAWINGS

By more specific description of the preferred embodiment of the present disclosure shown in the drawings, the above and other purposes, features and advantages of the present disclosure will become more clear. The same reference numerals in all the drawings indicate the same parts, and the drawings are not deliberately drawn to the same scale as the actual size, and the main point of the present disclosure is illustrated.

By reading the detailed description of the non-limiting embodiment with reference to the following drawings, other features, purposes and advantages of the present disclosure will become more obvious.

Figure 1:
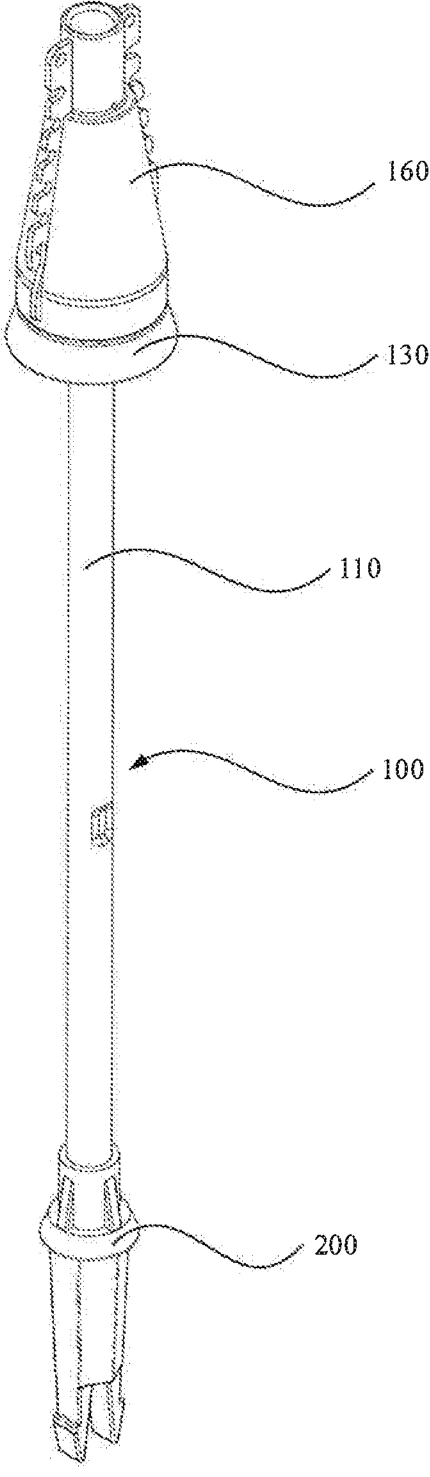
FIG. 1 is a schematic diagram of a bracket according to an embodiment of the present disclosure, at which time a second support seat is connected to a first support seat.

Reference numeral description:

100: bracket; 110: fixed rod; 111: fixed end; 112: inserted end; 113: inserted hole; 114: limit portion; 120: retractable rod; 121: connecting end; 122: projecting end; 123: first mounting portion; 124: annular groove; 130: first support seat; 131: first through hole; 132: inner ring portion; 133: outer peripheral portion; 134: cavity; 135: reinforcing rib; 136: male thread; 140: end portion; 141: first portion; 142: second portion; 150: abutting structure; 151: fixed portion; 152: resilient claw; 1521: connecting portion; 1522: abutting portion; 160: second support seat; 161: second through hole; 162: second mounting portion; 163: cylindrical hole; 164: female thread; 200: engaging member; 310: lateral branch; 320: apical branch.

DETAILED DESCRIPTION OF THE EMBODIMENTS

In order to facilitate the understanding of the present disclosure, the present disclosure will be described more completely hereinafter with reference to the related accompanying drawings. Preferred embodiments of the present disclosure is given in the drawings. However, the present disclosure may be embodied in many different forms and is not limited to the embodiments described herein. Conversely, the purpose of providing these embodiments is to make the disclosure of the present disclosure more thorough and comprehensive.

It should be noted that when one element is considered to be "connected" to another element, it may be directly connected to and incorporated with the other element, or it may exist simultaneously as a central element. The terms "mounting," "one end," "another end" and similar expressions used in this article are for illustrative purposes only.

All technical and scientific terms used herein have the same meaning as commonly understood by skilled person in the art to which the present disclosure belongs, unless otherwise defined. The terms used in the specification of the present disclosure are only for the purpose of describing specific embodiments and are not intended to limit the present disclosure. The term "and/or" used herein includes any and all combinations of one or more of the associated listed objects.

Reference will be made to the accompanying drawings and embodiments to describe the present disclosure in detail, so that the objects, technical solutions and advantages of the present disclosure can be more apparent and understandable. It should be understood that the specific embodiments described herein are only used to explain the present disclosure, but not to limit the present disclosure.

The present disclosure provides an artificial tree, such as an artificial Christmas tree. The artificial tree includes a retractable bracket 100 connected to a support device (not shown in the drawings), such that the artificial tree can be placed smoothly on the ground or on a table surface. Optionally, the bracket 100 is capable of being removably connected to the support device (not shown) to reduce the occupation space of the artificial tree and the support device (not shown) in a non-use state, which is convenient for transportation and storage. The user may connect the desired style of branches (not shown) on the bracket 100 as needed, such as pine branches of the artificial Christmas tree, to obtain the artificial tree with the desired style.

Figure 2:
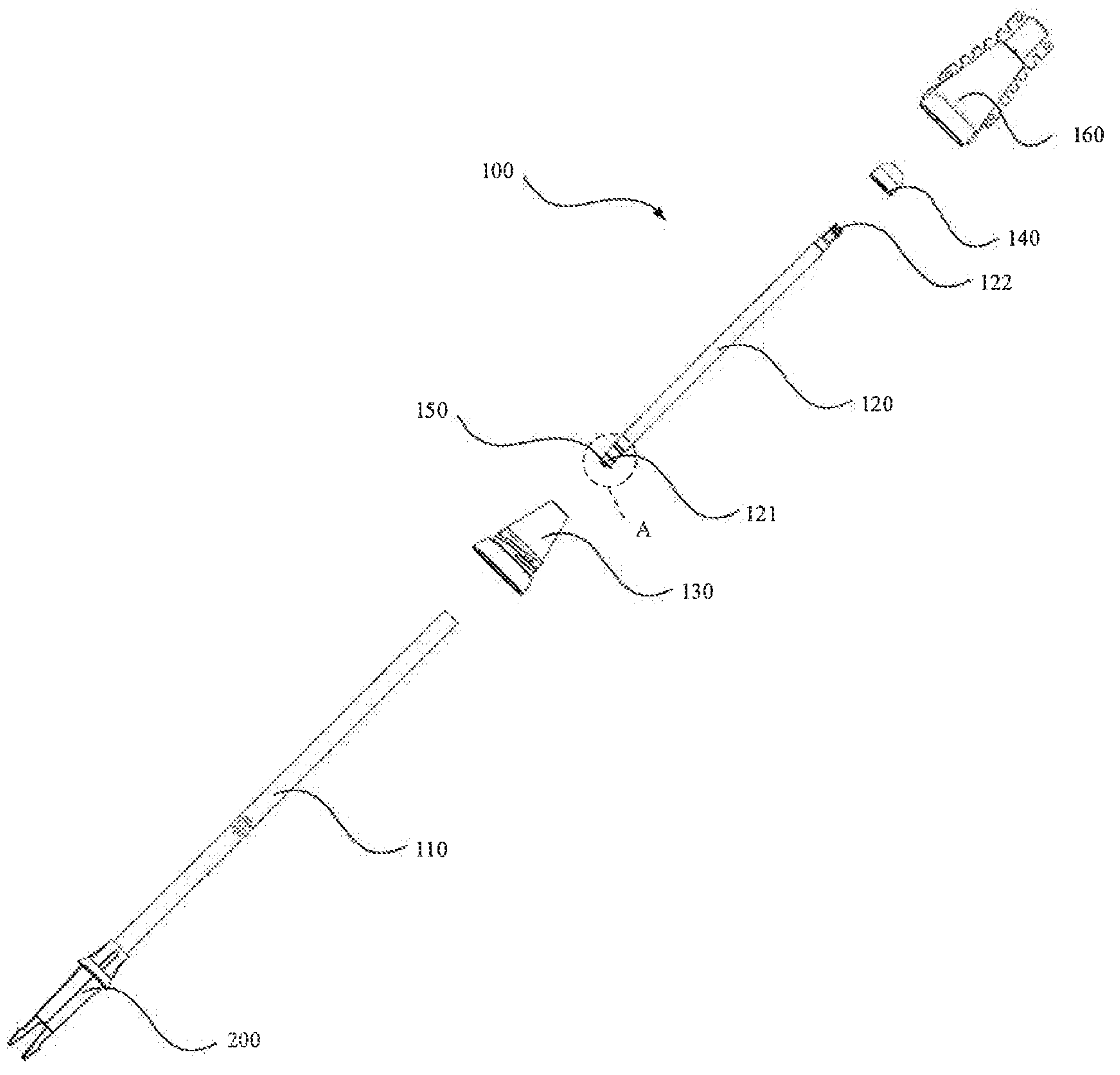
FIG. 2 is an explosive view of the bracket in FIG. 1.

In an embodiment, as shown in FIGS. 1 and 2, the bracket 100 includes a fixed rod 110, a retractable rod 120, and a first support seat 130. One end of the fixed rod 110 is connected to the support device (not shown). The first support seat 130 is sleeved on the retractable rod 120 and is capable of abutting against the fixed rod 110 to prevent the first support seat 130 from slipping or falling in a direction close to the support device (not shown). The retractable rod 120 is movably connected to the fixed rod 110 and is capable of being fixed relative to the fixed rod 110 in any desired position, such that a first mounting portion 123 is formed between the retractable rod 120 and the first support seat 130 configured to hang or place the ornament (see FIG. 7). In the bracket 100 of this embodiment, an ornament can be very easily to be hung or placed on the first mounting portion 123, and a dimension of the first mounting portion 123 can be adjusted by adjusting the relative position between the retractable rod 120 and the fixed rod 110 to securely hang or place an object to be placed, such as the ornament, on the first mounting portion 123. The arrangement of first support seat 130 increases an area below the first mounting portion 123 for hanging or placing the object to be placed, preventing the object to be placed from slipping or falling off from the first mounting portion 123. In other embodiments, the first support seat 130 may be omitted. A first mounting portion 123 is formed directly between the fixed rod 110 and the retractable rod 120.

Figure 3:
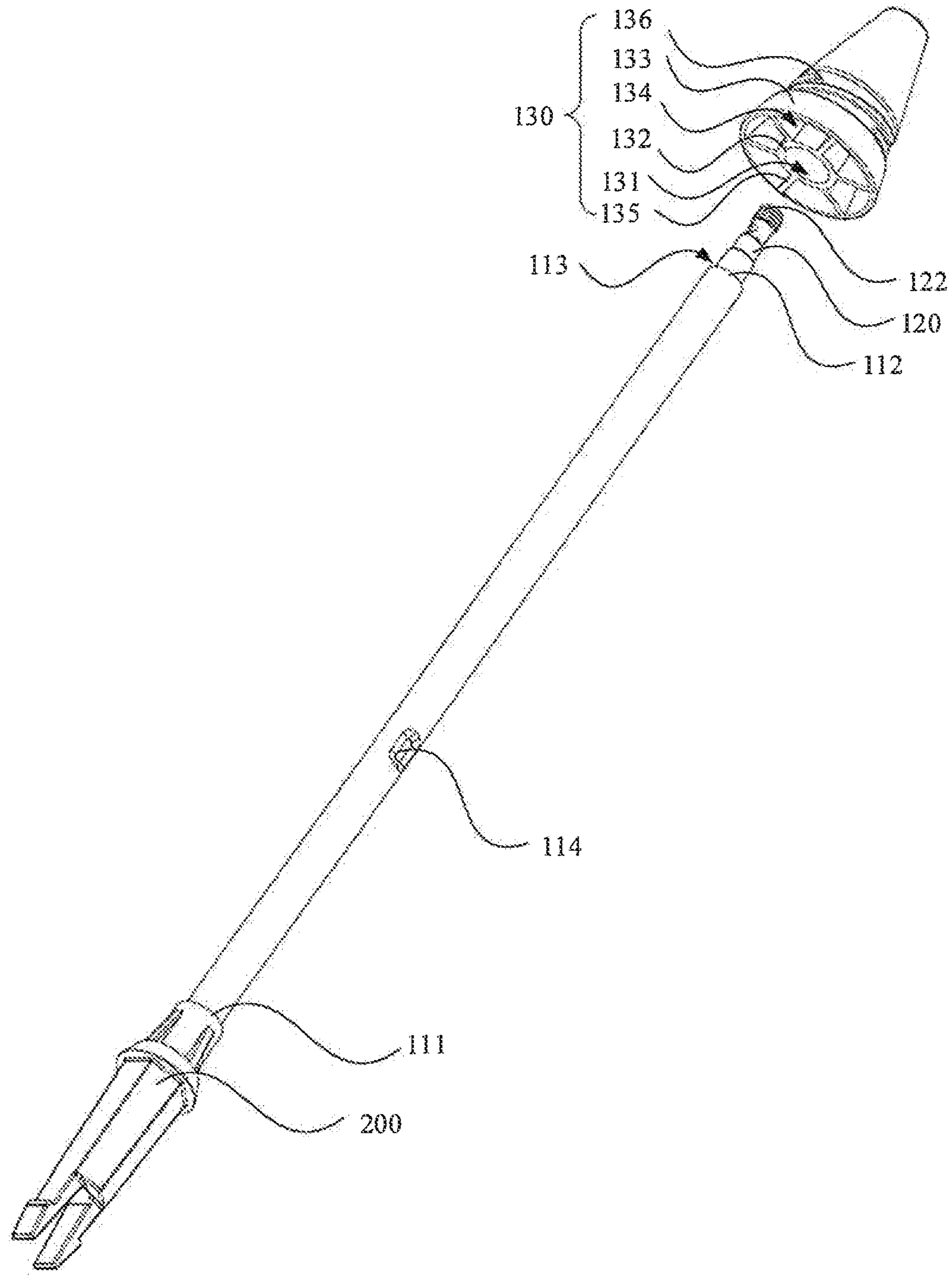
FIG. 3 is a schematic assembly diagram of the support seat and a retractable rod of the bracket in FIG. 1.

In an embodiment, as shown in FIG. 3, the fixed rod 110 includes a fixed end 111 connected to the support device (not shown) and an inserted end 112 away from the fixed end 111, and at least an inserted hole 113 is provided near the inserted end 112. The inserted hole 113 extends in an axial direction of the fixed rod 110. In this embodiment, the fixed rod 110 has a hollow tubular structure, and the inserted hole 113 extends through the inserted end 112 and the fixed end 111 of the fixed rod 110. Optionally, the fixed rod 110 is a hollow circular tube. The fixed end 111 is engaged with the support device (not shown) via the engaging member 200. Optionally, the fixed end may be removably connected to the support device via plug connection, threaded connection, engagement connection, etc. The fixed end 111 may also be permanently attached to the support device (not shown) as required.

In an embodiment, as shown in FIG. 3, the first support seat 130 includes an inner ring portion 132 provided with a first through hole 131 and an outer peripheral portion 133 surrounding the inner ring portion 132. In this embodiment, an outer contour of the outer peripheral portion 133 has a shape of circular truncated cone, such that when the first support seat 130 is removably connected to the inserted end 112, the overall outer contour of the outer peripheral portion 133 and the artificial tree can be smoothly transited without appearing abrupt. In other embodiments, the outer contour of the outer peripheral portion 133 can be arranged in other shapes according to the needs of the user, and the present disclosure does not restrict this. In this embodiment, an aperture at the smallest aperture position of the first through hole 131 is smaller than an outer diameter of the inserted end 112 to prevent the first support seat 130 from slipping from the inserted end 112 to the fixed end 111. In other embodiments, the aperture of the first through hole 131 may be greater than or equal to the outer diameter of the inserted end 112, and a stop portion (not shown) is provided at the inserted end 112 that is capable of restricting the slide of the first support seat 130 toward the fixed end 111. In conclusion, as long as the first support seat 130 can be prevented from slipping into the fixed end 111, the present disclosure does not limit thereto. The outer peripheral portion 133 is connected to the inner ring portion 132. At least part of the outer peripheral portion 133 and at least part of the inner ring portion 132 form a cavity 134, such that the overall weight of the first support seat 130 is reduced, thereby reducing the production cost of the first support seat 130 and make the bracket overall lighter. In order to enhance the connection strength between the inner ring portion 132 and the outer peripheral portion 133, a reinforcing rib 135 is provided in the cavity 134, and both ends of the reinforcing rib 135 are connected to the inner ring portion 132 and the outer peripheral portion 133, respectively.

Figure 4:
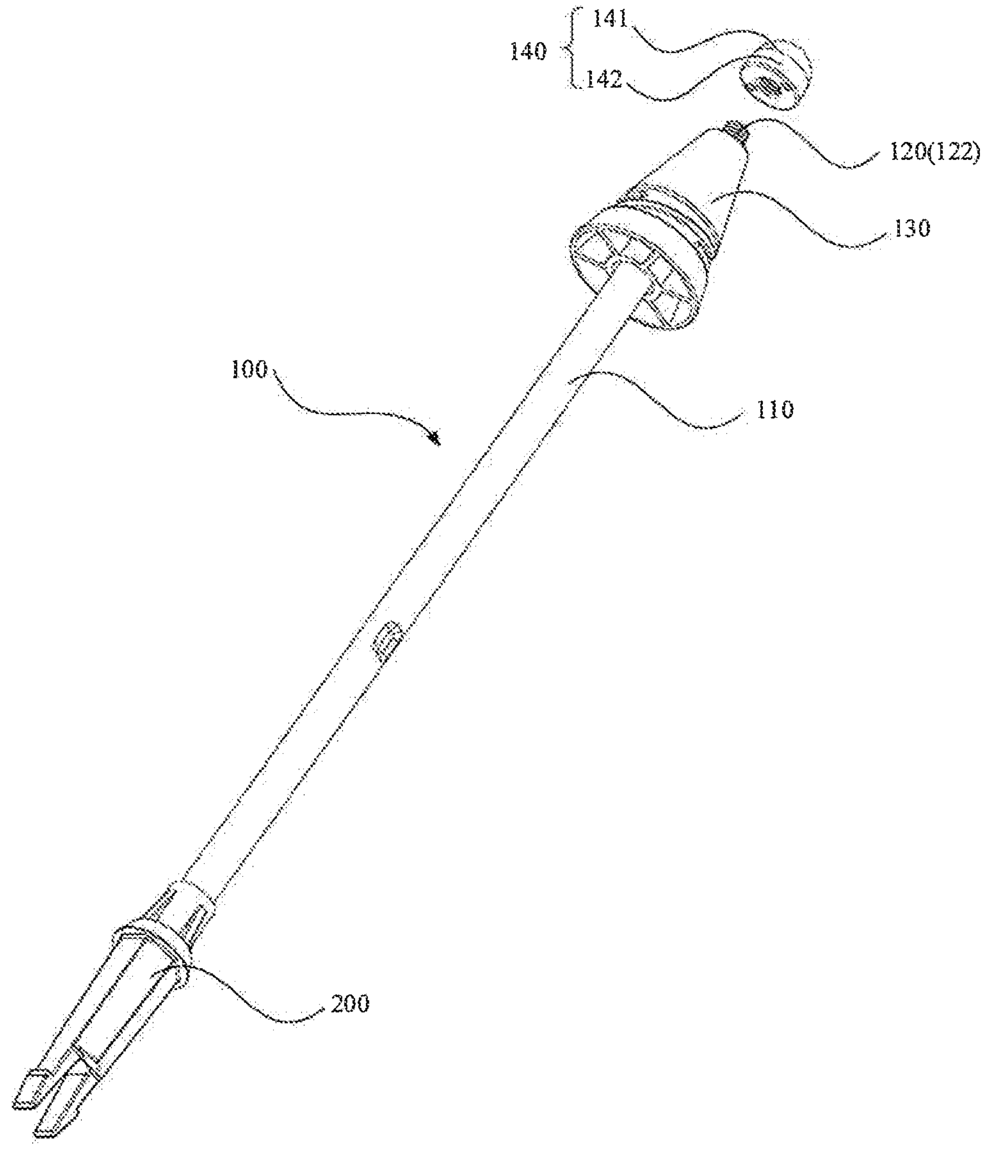
FIG. 4 is a schematic assembly diagram of an end portion, the first support seat and the retractable rod of the bracket in FIG. 1.
Figure 7:
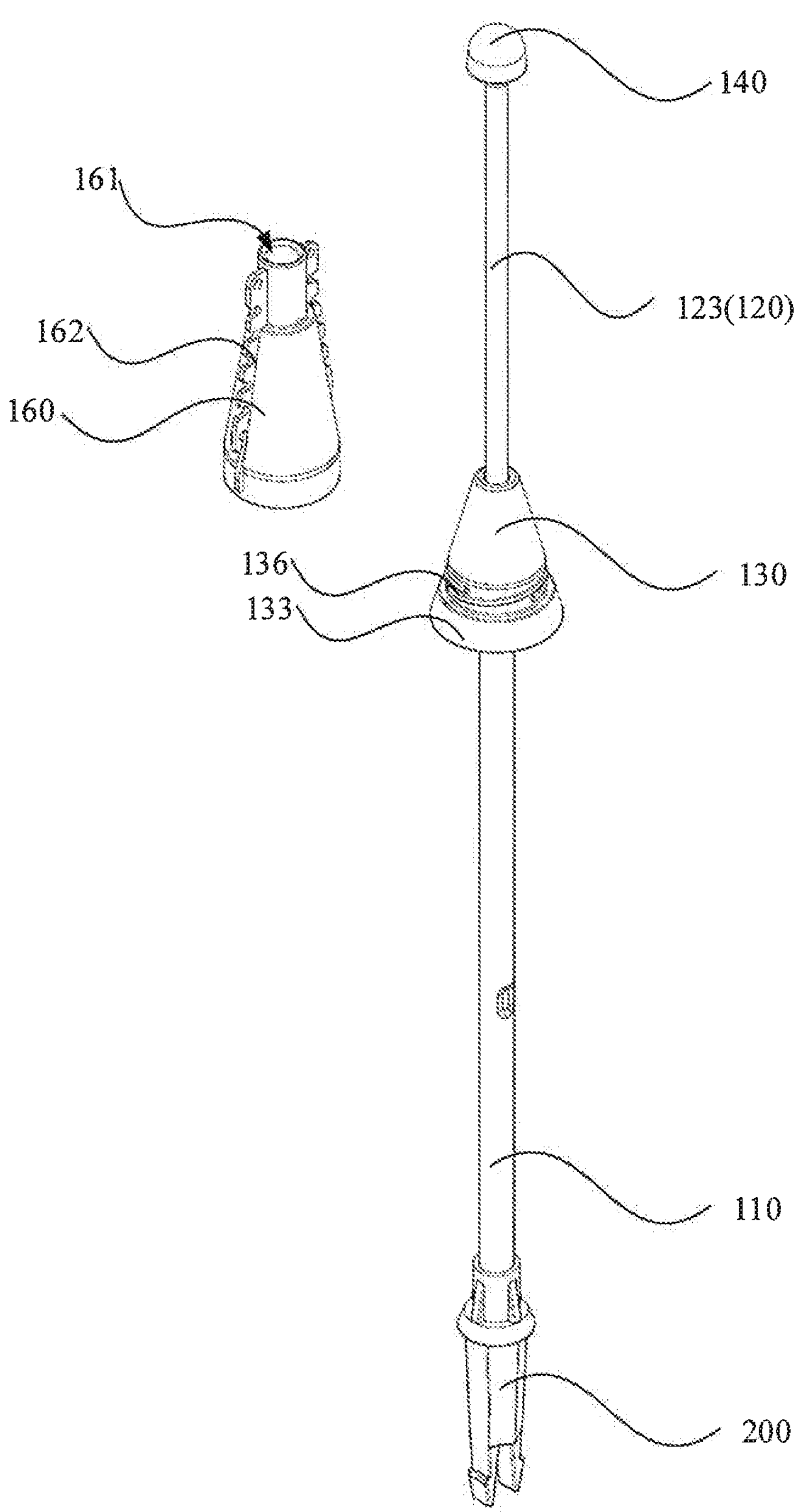
FIG. 7 is a schematic diagram of the bracket in FIG. 6, where the retractable rod is elongated relative to a fixed rod.

In an embodiment, as shown in FIGS. 2, 4, and 7, the retractable rod 120 includes a connecting end 121 and a projecting end 122. The connecting end 121 is movably inserted into the inserted hole 113 and is capable of being fixed relative to the fixed rod 110 in any desired position. At least part of the projecting end 122 extends out of the inserted hole 113, and at least part of the projecting end 122 extends out of the first through hole 131. In an embodiment, as shown in FIGS. 4 and 7, the bracket 100 also includes an end portion 140 removably connected to the projecting end 122, and a first mounting portion 123 is formed between the end portion 140 and the inserted end 112. The end portion 140 has a bell shape to facilitate operation when the end portion 140 is connected to the projecting end 122 to move the retractable rod 120 relative to the fixed rod 110. The arrangement of the end portion 122 may restrict the object to be placed on the first mounting portion, so as to prevent the object to be placed from falling off from the projecting end 122.

Specifically, as shown in FIG. 4, the end portion 140 includes a first portion 141 and a second portion 142. The first portion 141 has a substantially hemispherical shape, and the second portion 142 has a substantially circular truncated cone or cylindrical shape. The cross-section of the hemisphere is connected to the second portion 142, and a smooth transition is formed between the first portion 141 and the second portion 142. An outer diameter of at least part of the end portion 140 is greater than an inner diameter of the first through hole 131 to prevent the end portion 140 from extending through the first through hole 131 towards the fixed end 111 of the fixed rod 110. Further, an outer diameter of a position of the end portion 140 close to the first support seat 130 is substantially the same as that of an outer diameter of a position of the first support seat 130 close to end portion 140. In this embodiment, the end portion 140 is threadably connected to the projecting end 122, such that the first support seat 130 can be easily disassembled and replaced. In other embodiments, the end portion 140 can be removably connected to the retractable rod 120 by engagement connection.

Figure 5:
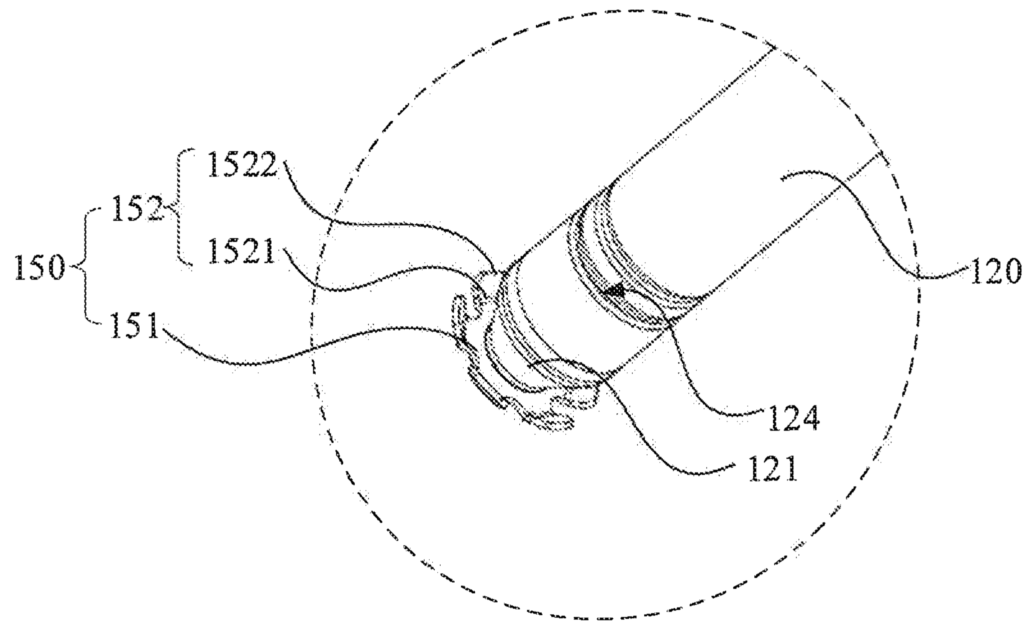
FIG. 5 is an enlarged view of portion A in FIG. 1.

In an embodiment, as shown in FIGS. 2 and 5, the retractable rod 120 is provided with an abutting structure 150 that is elastically deformable and is capable of abutting against an inner wall of the inserted hole 113, such that the retractable rod 120 is capable of being fixed relative to the fixed rod 110 in any desired position, and the retractable rod 120 can be operated to overcome a friction between the abutting structure 150 and the inner wall of the inserted hole 113 and move relative to the fixed rod 110. Optionally, the abutting structure 150 may be disposed at any location between the connecting end 121 and the projecting end 122. In this embodiment, the abutting structure 150 is disposed at the connecting end 121 of the retractable rod 120. As such, the mounting of the abutting structure 150 on the fixed rod 110 can be easily, and also the retractable rod 120 is allowed to have the maximum retractable range relative to the fixed rod 110.

In this embodiment, as shown in FIG. 5, the abutting structure 150 includes the fixed portion 151 and at least two resilient claws 152 connected to the fixed portion 151. The fixed portion 151 is connected to the connecting end 121. Optionally, the number of the resilient claws 152 may be, for example, two to eight. The number of resilient claws 152 can be selected according to actual needs. The resilient claw 152 extends in a direction away from a central axis of the retractable rod 120, and the resilient claw 152 abuts against the inner wall of the inserted hole 113 and is pressed by the inner wall of the inserted hole 113 to create a friction between the resilient claw 152 and the inner wall of the inserted hole 113. Each resilient claw 152 includes a connecting portion 1521 and an abutting portion 1522. The connecting portion 1521 is connected to the fixed portion 151. The abutting portion 1522 abuts against the inner wall of the inserted hole 113. The abutting portion 1522 is farther from the central axis of the retractable rod 120 than the connecting portion 1521. In this embodiment, the resilient claw 152 is an integrally formed component. When the abutting portion 1522 is inserted into the inserted hole 113, the abutting portion 1522 is compressed by an inner wall of the inserted hole 113, such that the resilient claw 152 is compressed into deformation toward the central axis, and the resilient claw 152 is pressed tightly against the inner wall of the inserted hole 113 by the reaction force of the resilient claw 152 against the deformation, such that the friction is generated between the resilient claw 152 and the inner wall of the inserted hole 113, thus the retractable rod 120 is prevented from moving in a direction of submerging in the inserted hole 113. Optionally, the abutting portion 1522 is farther from the connecting end 121 or the projecting end 122 compared to the connecting portion 1521. In this embodiment, as shown in FIG. 5, the resilient claw 152 is bent upward from the connecting end 121, that is, the abutting portion 1522 is farther from the connecting end 121 than the connecting portion 1521.

In other embodiments (not shown), the abutting portion 1522 and the connecting portion 1521 are two separate components, respectively. The connecting portion 1521 is an elastic component that can generate elastic deformation. The abutting portion 1522 can be either a rigid component or an elastic component. At least a surface of the abutting portion 1522 facing the inner wall of the inserted hole 113 is an inclined surface or a curved surface, such that the abutting portion 1522 can enter the inserted hole 113 without being directly operated. That is, when the retractable rod 120 is operated to be inserted into the inserted hole 113, the abutting portion 1522 is capable of entering the inserted hole and abutting against the inner wall of the inserted hole 113, such that the connecting portion 1521 connected to the abutting portion 1522 is compressed to deform toward the central axis, therefore the abutting portion 1522 is tightly pressed against the inner wall of the inserted hole 113 by the reaction force against the deformation generated by the connecting portion 1521, and in turn creates the friction between the abutting portion 1522 and the inner wall of the inserted hole 113 to prevent the retractable rod 120 from moving in the direction of submerging in the inserted hole 113.

To further increase the friction between the retractable rod 120 and the inner wall of the inserted hole 113, an O-ring (not shown) is also placed on the retractable rod 120. Referring to FIG. 5, in order to prevent the O-ring from sliding along the retractable rod 120, an annular groove 124 configured to place the O-ring is provided on the retractable rod 120. Optionally, the annular groove 124 is provided near the abutting structure 150. There may be, for example, two annular grooves 124.

In other embodiments, the abutting structure 150 (not shown) may be other elastically deformable structures, such as rubber blocks, rubber rings, etc. The elastically deformable structure is capable of abutting against the inner wall of the inserted hole 113 and generate the friction to prevent the retractable rod 120 from slipping along the inserted hole 113 without being operated.

In order to avoid misoperation or deformation failure of the abutting structure 150, the retractable rod 120 is completely submerged in the inserted hole 113 of the fixed rod 110, and a limit portion 114 is provided in the fixed rod 110, and the limit portion 114 is capable of abutting against the abutting structure 150 or the connecting end 121 of the retractable rod 120 to restrict the retractable rod 120 from submerging into the inserted hole 113. In this embodiment, the limit portion 114 is a limiting projection formed on the inner wall of the inserted hole 113 due to the inward depression of the side wall portion of the fixed rod 110.

Figure 6:
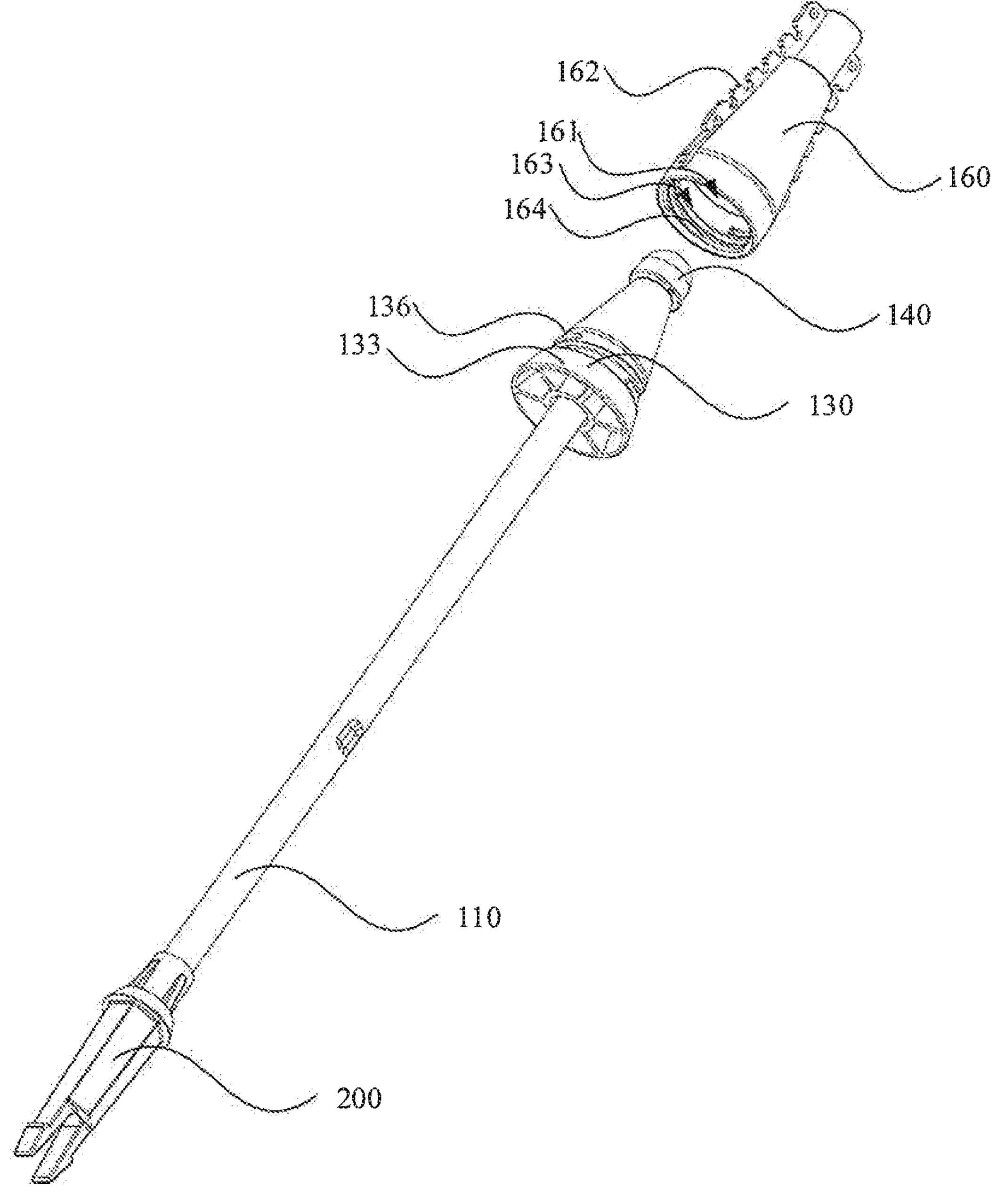
FIG. 6 is a schematic diagram of the bracket in FIG. 1, where the second support seat is detached from the first support seat.
Figure 8:
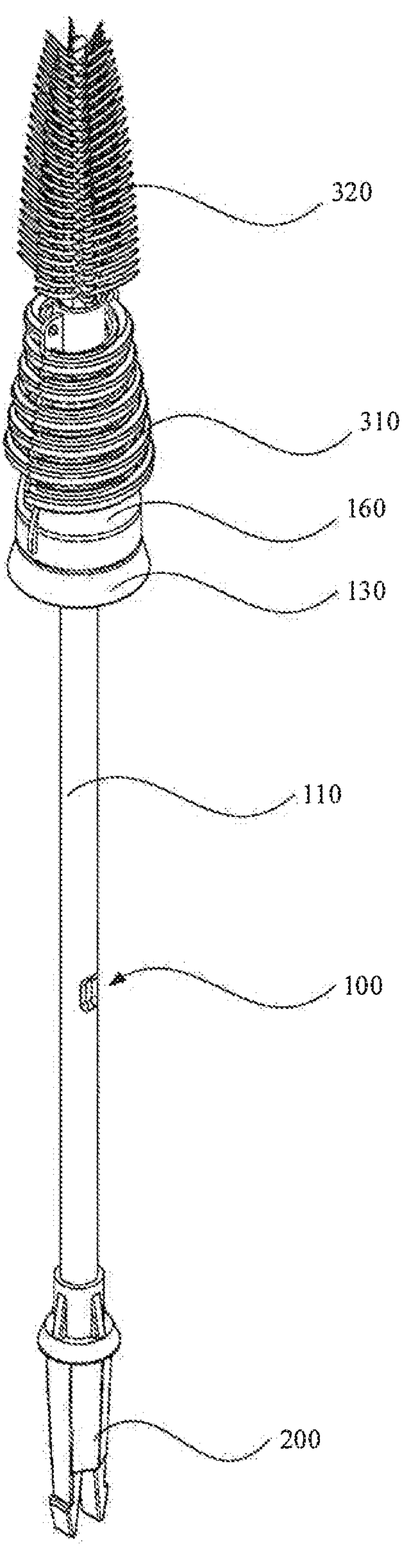
FIG. 8 is a reference diagram of the use state of the second support seat of the bracket in FIG. 1 where the second support seat is connected to the first support seat, and a lateral branch and an apical branch are mounted on the second support seat.

In an embodiment, as shown in FIGS. 1, 6, and 7, the bracket 100 also includes a second support seat 160 provided with a second mounting portion 162 configured to mount a lateral branch 310 (e.g., the pine branch of the simulation Christmas tree). Refer to FIG. 8 for the reference diagram of the use state of the second support seat connected to the first support seat 130, where a lateral branch 310 and an apical branch 320 are mounted on the second support seat. The lateral branch 310 is removably connected to the second mounting portion 162. The second support seat 160 is capable of being removably connected to the first support seat 130, such that the second support seat 160 is capable of selectively covering at least part of the first support seat 130. Referring to FIGS. 6 and 7, the second support seat 160 is provided with a second through hole 161 extending through the second support seat 160, at least part of the second through hole 161 is a cylindrical hole 163, and an inner wall of the cylindrical hole 163 is provided with female threads 164. At least part of an outer circumference of the first support seat 130 is provided with male threads 136, which is provided in the vicinity of outer peripheral portion 133 of the first support seat 130 near inserted end 112. At least part of the first support seat 130 with the male threads 136 extends into the second through hole 161 and is threadably connected to the female threads 164 via the male threads 136. Optionally, the second support seat 160 can also be removably connected to the first support seat 130 by means such as engagement connection, plug connection, etc. Referring to FIG. 8, a top end of the second support seat 160 is provided with an apical branch 320 inserted into the second through hole 161 to better shape the top of the artificial tree.

Figure 9:
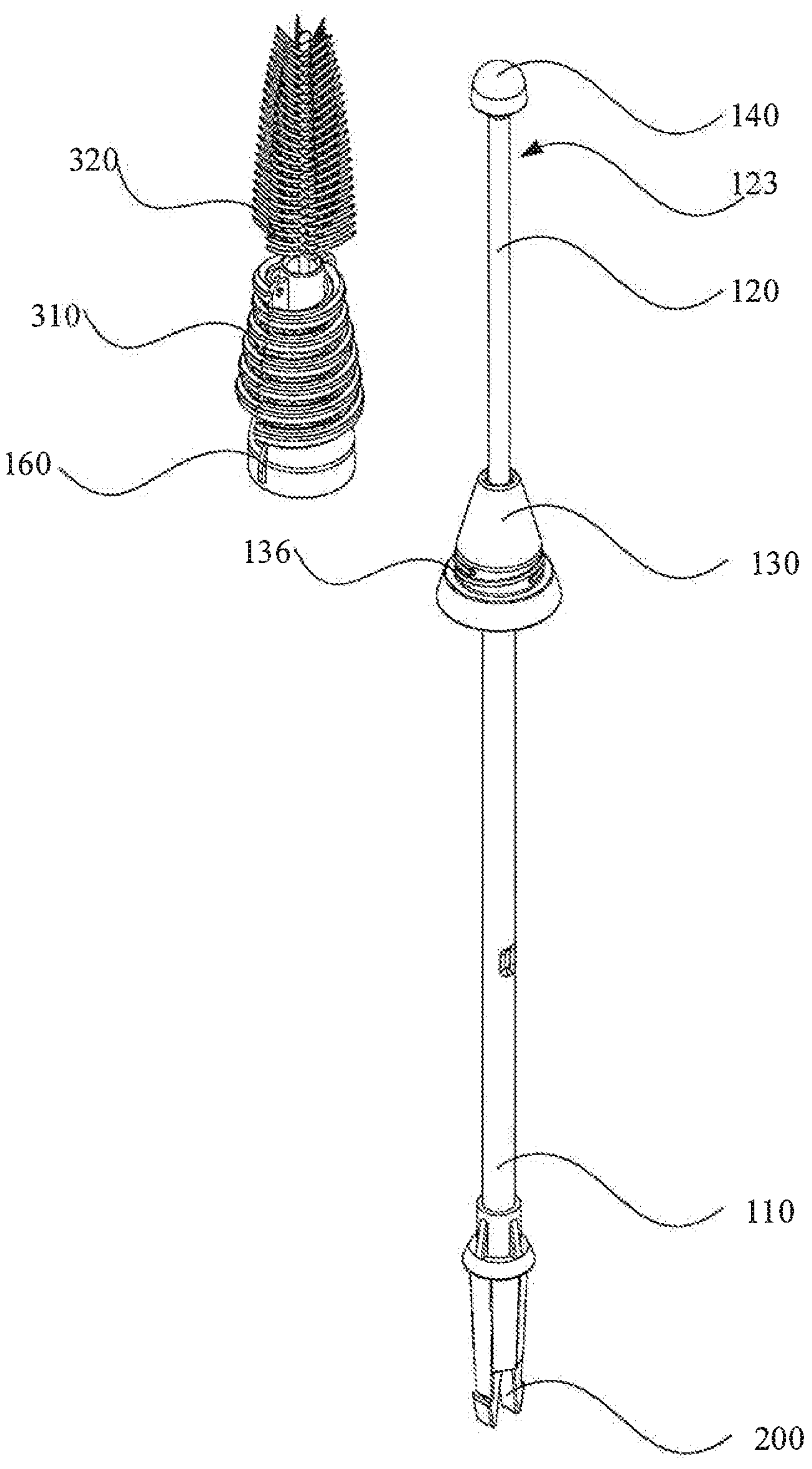
FIG. 9 is a schematic diagram of the bracket in FIG. 8, where the second support seat, along with the lateral branch and the apical branch, is detached from the first support seat and the retractable rod is elongated relative to the fixed rod.

In this embodiment, both the first support seat 130 and the second support seat 160 are located at the top portion of the artificial tree, that is, the artificial tree is away from the end of the supporting device. The end portion 140 is located above the first support seat 130, the second support seat 160 is capable of selectively covering most of the end portion 140 and the first support seat 130, and make a smooth transition with a part of the first support seat 130 exposed on the second support seat 160. The shape of the top of the artificial tree can be created by mounting the lateral branch 310 and the apical branch 320 on the second support seat 160 when the object to be placed is not hung or placed on the artificial tree (see FIG. 8). Referring to FIG. 9, with the lateral branch 310 and apical branch 320 mounted, the second support seat 160 can be taken off the first support seat 130 together with the lateral branch 310 and the apical branch 320.

The method of using the bracket 100 in this embodiment is as follows.

When it is necessary to hang or place the object to be placed on the artificial tree, the second support seat 160 is removed from the first support seat 130 (referring to FIGS. 6 and 7), and then the end portion 140 is pulled upward, such that the retractable rod 120 extends and moves relative to the fixed rod 110 to enlarge the dimension of the first mounting portion 123. Then the object to be placed can be easily hung or placed on the first mounting portion 123. The retractable rod 120 is then shortened and moved relative to the fixed rod 110 by pressing the end portion 140 to reduce the dimension of the first mounting portion 123, such that the object to be placed can be securely limited to the first mounting portion 123, thereby preventing the object to be placed from falling accidentally.

When it is not necessary to hang or place the object to be placed on the artificial tree, after removing the object to be placed, (referring to FIGS. 1 and 8) the second support seat 160 is covered on the end portion 140 and the first support seat 130, and the required branches 310, 320 are mounted on the second support seat 160 as required. Optionally, for the mounting convenience for the user, the lateral branch 310 may be mounted on the second support seat 160 at the factory, and the required apical branch 320 may be provided as well. The user only needs to insert the apical branch 320 into the second through hole 161 when using. The object to be placed is capable of being hung or placed on the artificial tree of the present disclosure, and the overall appearance of the artificial trees will not be affected when the object to be placed is not hung or placed thereon.

In another embodiment (not shown), the first support seat 130 may be omitted. The second support seat 160 is provided with a second through hole 161 extending through the second support seat 160 and a second mounting portion 162 configured to mount the lateral branch 310. The lateral branch 310 is capable of being removably connected to the fixed rod 110 via the second support seat 160, and the projecting end 122 of the retractable rod 120 extends through and out of the second through hole 161. The end portion 140 is removably connected to the projecting end 122, such that a first mounting portion 123 is formed between the end portion 140 and the second support seat 160. In this embodiment, the dimension of the first mounting portion 123 can be adjusted by moving the retractable rod 120 without removing the second support seat 160, such that the object to be placed can be easily and securely hung or placed with the first mounting portion 123, without affecting the overall appearance of the artificial tree when the object to be placed is not hung or placed.

The artificial tree and the retractable bracket of the present disclosure have at least the following technical effects:

In the artificial tree and the bracket 100 of the present disclosure, the retractable rod 120 is fixed relative to the fixed rod 110 in any desired position by movably connecting the retractable rod 120 and the fixed rod 110, such that the first mounting portion 123 configured to hang or place the ornament is formed between the retractable rod 120 and the first support seat 130. This makes it very convenient to hang or place the ornament on the first mounting portion 123 and to adjust the dimension of the first mounting portion 123 by adjusting the relative position between the retractable rod 120 and the fixed rod 110 to securely hang or place the object to be placed, such as the ornament, on the first mounting portion 123.

The technical features of the aforementioned embodiments may be combined arbitrarily. To simplify the description, not all the possible combinations of the technical features in the aforementioned embodiments are described. However, all of the combinations of these technical features should be considered as within the scope of the present disclosure, as long as such combinations do not contradict with each other.

The detailed embodiments described herein are only for the purpose of illustrating the present disclosure, and are not intended to limit the scope of the present disclosure in any way. It would be understood by a person skilled in the art that various changes and modifications can be made to the embodiments described herein without departing from the scope and spirit of the present disclosure. Therefore, the protection scope of the present disclosure should be defined by the following claims.

What is claimed is:

1. A retractable bracket connected to a supporting device comprising:

a fixed rod connected to the supporting device;

a retractable rod movably connected to the fixed rod, wherein the retractable rod is capable of being fixed relative to the fixed rod in any desired position, such that a first mounting portion configured to hang or place an object to be placed is formed between the retractable rod and the fixed rod;

wherein the fixed rod further comprises a fixed end connected to the support device and an inserted end away from the fixed end, at least the inserted end is provided with an inserted hole extending in an axial direction of the fixed rod, the retractable rod comprises a connecting end and a projecting end, the connecting end is movably inserted into the inserted hole and is capable of being fixed relative to the fixed rod in any desired position, and at least part of the projecting end extends out of the inserted hole, such that the first mounting portion is formed between the projecting end and the inserted end;

a first support seat provided with a first through hole extending through the first support seat, wherein the first support seat is removably connected to the inserted end, and the projecting end of the retractable rod extends through and out of the first through hole, such that the first mounting portion is formed between the projecting end and the first support seat; and a second support seat provided with a second through hole extending through the second support seat and a second mounting portion configured to mount a branch, the branch is removably connected to the fixed rod via the second support seat, and the projecting end of the retractable rod extending through and out of the second through hole, such that the first mounting portion is formed between the projecting end and the second support seat.

2. The bracket according to claim 1, wherein the retractable rod is provided with an abutting structure which is elastically deformable and is capable of abutting an inner wall of the inserted hole, such that the connecting end is capable of being fixed relative to the fixed rod in any desired position, and wherein the retractable rod is operable to move relative to the fixed rod to overcome a friction between the abutting structure and the inner wall of the inserted hole.

3. The bracket according to claim 2, wherein the abutting structure comprises a fixed portion and at least two resilient claws connected to the fixed portion, each resilient claw extends in a direction away from a central axis of the retractable rod, and each resilient claw abuts against the inner wall of the inserted hole and is pressed by the inner wall of the inserted hole to create a friction between the resilient claw and the inner wall of the inserted hole.

4. The bracket according to claim 3, wherein each resilient claw comprises a connecting portion and an abutting portion, the connecting portion is connected to the retractable rod, the abutting portion abuts against the inner wall of the inserted hole, and the abutting portion is farther from the central axis of the retractable rod than the connecting portion.

5. The bracket according to claim 4, wherein the abutting portion is farther from the connecting end or the projecting end than the connecting portion.

6. The bracket according to claim 3, wherein the at least two resilient claws comprise 2 to 8 resilient claws.

7. The bracket according to claim 2, wherein the abutting structure is provided on the connecting end of the retractable rod.

8. The bracket according to claim 2, wherein a limit portion is provided in the inserted hole, and the limit portion is capable of abutting against the abutting structure or the connecting end of the retractable rod to restrict the retractable rod from moving in a direction of submerging in the inserted hole.

9. The bracket according to claim 1, wherein the projecting end of the retractable rod is provided with an end portion, and the first mounting portion is formed between the end portion and the inserted end.

10. The bracket according to claim 9, wherein the end portion is removably connected to the projecting end of the retractable rod.

11. The bracket according to claim 1, wherein an aperture at a smallest aperture position of the first through hole comprises an inner diameter smaller than an outer diameter of the inserted end.

12. The bracket according to claim 1, wherein the first support seat comprises an inner ring portion provided with the first through hole and an outer peripheral portion surrounding the inner ring portion, the outer peripheral portion is connected to the inner ring portion, and a cavity is formed between at least part of the outer peripheral portion and at least part of the inner ring portion.

13. The bracket according to claim 12, wherein a reinforcing rib is provided in the cavity, and both ends of the reinforcing rib are connected to the inner ring portion and the outer peripheral portion, respectively.

14. The bracket of claim 1, further comprising a second support seat provided with a second mounting portion configured to mount a branch, and the second support seat is removably connected to the first support seat, such that the second support seat is capable of selectively covering at least part of the first support seat.

15. The bracket according to claim 14, wherein the second support seat is provided with a second through hole extending through the second support seat, at least part of an inner wall of the second through hole is provided with female threads, at least part of an outer circumference of the first support seat is provided with male threads, and at least part of the support seat provided with the male threads is capable of extending into the second through hole and is threadably connected to the female threads via the male threads.

16. The bracket according to claim 15, wherein at least part of the second through hole is a cylindrical hole, and the female threads are disposed on an inner wall of the cylindrical hole.

17. An artificial tree, comprising a retractable bracket as claimed in claim 1.

18. A retractable bracket connected to a supporting device comprising:

a fixed rod connected to the supporting device;

a retractable rod movably connected to the fixed rod, wherein the retractable rod is capable of being fixed relative to the fixed rod in any desired position, such that a first mounting portion configured to hang or place an object to be placed is formed between the retractable rod and the fixed rod;

wherein the fixed rod further comprises a fixed end connected to the support device and an inserted end away from the fixed end, at least the inserted end is provided with an inserted hole extending in an axial direction of the fixed rod, the retractable rod comprises a connecting end and a projecting end, the connecting end is movably inserted into the inserted hole and is capable of being fixed relative to the fixed rod in any desired position, and at least part of the projecting end extends out of the inserted hole, such that the first mounting portion is formed between the projecting end and the inserted end;

a first support seat provided with a first through hole extending through the first support seat, wherein the first support seat is removably connected to the inserted end, and the projecting end of the retractable rod extends through and out of the first through hole, such that the first mounting portion is formed between the projecting end and the first support seat;

wherein the first support seat comprises an inner ring portion provided with the first through hole and an outer peripheral portion surrounding the inner ring portion, the outer peripheral portion is connected to the inner ring portion, and a cavity is formed between at least part of the outer peripheral portion and at least part of the inner ring portion; and wherein a reinforcing rib is provided in the cavity, and both ends of the reinforcing rib are connected to the inner ring portion and the outer ring portion, respectively.

19. A retractable bracket connected to a supporting device comprising:

a fixed rod connected to the supporting device;

a retractable rod movably connected to the fixed rod, wherein the retractable rod is capable of being fixed relative to the fixed rod in any desired position, such that a first mounting portion configured to hang or place an object to be placed is formed between the retractable rod and the fixed rod;

wherein the fixed rod further comprises a fixed end connected to the support device and an inserted end away from the fixed end, at least the inserted end is provided with an inserted hole extending in an axial direction of the fixed rod, the retractable rod comprises a connecting end and a projecting end, the connecting end is movably inserted into the inserted hole and is capable of being fixed relative to the fixed rod in any desired position, and at least part of the projecting end extends out of the inserted hole, such that the first mounting portion is formed between the projecting end and the inserted end;

a first support seat provided with a first through hole extending through the first support seat, wherein the first support seat is removably connected to the inserted end, and the projecting end of the retractable rod extends through and out of the first through hole, such that the first mounting portion is formed between the projecting end and the first support seat; and a second support provided with a second mounting portion configured to mount a branch, and the second support seat is removably connected to the first support seat, such that a second support seat is capable of selectively covering at least part of the first support seat.

* * * * *